United States Patent
Bois

(10) Patent No.: US 9,534,818 B2
(45) Date of Patent: Jan. 3, 2017

(54) HEAT PUMP SYSTEM WITH AUXILIARY HEAT EXCHANGER

(71) Applicant: SI2 Industries, LLC, Shoreview, MN (US)

(72) Inventor: David G. Bois, Lino Lakes, MN (US)

(73) Assignee: SI2 Industries, LLC, Shoreview, MN (US)

(*) Notice: Subject to any disclaimer, the term of this patent is extended or adjusted under 35 U.S.C. 154(b) by 996 days.

(21) Appl. No.: 13/743,140

(22) Filed: Jan. 16, 2013

(65) Prior Publication Data

US 2013/0180266 A1 Jul. 18, 2013

Related U.S. Application Data

(60) Provisional application No. 61/587,596, filed on Jan. 17, 2012.

(51) Int. Cl.
*F25B 30/02* (2006.01)
*F25B 49/02* (2006.01)
(Continued)

(52) U.S. Cl.
CPC .............. *F25B 30/02* (2013.01); *F24D 5/12* (2013.01); *F24D 12/02* (2013.01);
(Continued)

(58) Field of Classification Search
CPC .............. F25B 13/00; F25B 2313/009; F25B 2313/021; F25B 2313/0213; F25B 2313/0214; F25B 2313/0215; F25B 2313/08; F25B 2500/02; F25B 2700/2106
(Continued)

(56) References Cited

U.S. PATENT DOCUMENTS 2,461,449 A 2/1949 Smith et al.
2,689,090 A 9/1954 Wetherbee et al.
(Continued)

FOREIGN PATENT DOCUMENTS

EP 1686332 A1 2/2006

OTHER PUBLICATIONS

International Search Report, PCTUS2013/021832, Jun. 19, 2013, 5 pages.

*Primary Examiner* — Jonathan Bradford
(74) *Attorney, Agent, or Firm* — Fredrikson & Byron, P.A.

(57) ABSTRACT

Disclosed are embodiments of heat pump systems and methods for operating such systems in the heating mode while a heat pump operating parameter reaches or is equal to a predetermined operating value at which it is not advisable to use conventional heat pump systems for heating an enclosed structure. In addition to ancillary components, the heat pump systems includes indoor, outdoor and auxiliary heat exchangers, reversing and flow diverting valves, compressors, refrigerant superheat controllers, and auxiliary energy sources. During the heating mode of operation, while the heat pump operating parameter reaches or is equal to the predetermined operating value, the flow of liquid refrigerant through the outdoor heat exchangers is inhibited and is diverted to flow through the auxiliary heat exchangers. Thermal energy from the auxiliary energy source is used for evaporating the liquid refrigerant flowing through the auxiliary heat exchangers.

35 Claims, 4 Drawing Sheets

(51) Int. Cl.
  *F25B 13/00* (2006.01)
  *F24D 5/12* (2006.01)
  *F24D 12/02* (2006.01)
  *F24D 19/10* (2006.01)

(52) U.S. Cl.
  CPC .......... *F24D 19/1087* (2013.01); *F25B 13/00* (2013.01); *F25B 49/02* (2013.01); *F25B 2313/009* (2013.01); *F25B 2313/0213* (2013.01); *F25B 2313/0214* (2013.01); *F25B 2313/0215* (2013.01); *F25B 2500/02* (2013.01); *F25B 2700/2106* (2013.01); *Y02B 30/14* (2013.01)

(58) Field of Classification Search
  USPC ..................................... 62/160, 324.1, 324.6
  See application file for complete search history.

(56) References Cited

U.S. PATENT DOCUMENTS

| | | | |
|---|---|---|---|
| 3,240,028 A | 3/1966 | Redfern et al. | |
| 3,563,304 A | 2/1971 | McGrath | |
| 3,589,437 A | 6/1971 | Shoji et al. | |
| 3,768,274 A | 10/1973 | Fink | |
| 3,777,508 A | 12/1973 | Imabayashi et al. | |
| 4,027,497 A | 6/1977 | Thurman | |
| 4,100,763 A | 7/1978 | Brody | |
| 4,143,707 A * | 3/1979 | Lewis | F24D 11/0271 165/242 |
| RE29,966 E | 4/1979 | Nussbaum | |
| 4,165,037 A | 8/1979 | McCarson | |
| 4,191,023 A | 3/1980 | Sisk | |
| 4,325,228 A | 4/1982 | Wolf | |
| 4,409,796 A | 10/1983 | Fisher | |
| 4,454,725 A | 6/1984 | Cann | |
| 4,484,452 A | 11/1984 | Houser, Jr. | |
| 4,493,193 A | 1/1985 | Fisher | |
| 4,501,127 A | 2/1985 | Sommers et al. | |
| 4,553,401 A | 11/1985 | Fisher | |
| 4,569,207 A | 2/1986 | James | |
| 4,614,090 A | 9/1986 | Kaneko et al. | |
| 4,646,537 A | 3/1987 | Crawford | |
| 4,796,437 A | 1/1989 | James | |
| 4,805,689 A | 2/1989 | Inada et al. | |
| 5,003,788 A | 4/1991 | Fischer | |
| 5,109,677 A | 5/1992 | Phillippe | |
| 5,211,023 A | 5/1993 | Matsuura | |
| 5,361,601 A * | 11/1994 | Han | F24F 1/022 165/240 |
| 5,429,179 A | 7/1995 | Klausing | |
| 5,473,907 A | 12/1995 | Briggs | |
| 5,628,200 A | 5/1997 | Pendergrass | |
| 5,671,608 A | 9/1997 | Wiggs et al. | |
| 5,758,507 A | 6/1998 | Schuster et al. | |
| 5,758,514 A | 6/1998 | Genung et al. | |
| 5,966,952 A | 10/1999 | Misawa et al. | |
| 5,983,660 A | 11/1999 | Kiessel et al. | |
| 6,050,102 A | 4/2000 | Jin et al. | |
| 6,604,376 B1 | 8/2003 | Demarco et al. | |
| 6,615,602 B2 | 9/2003 | Wilkinson | |
| 6,735,969 B2 | 5/2004 | Kasagi et al. | |
| 6,883,342 B2 | 4/2005 | Kato et al. | |
| 7,503,184 B2 | 3/2009 | Copeland et al. | |
| 2003/0041609 A1 | 3/2003 | Kassagi et al. | |
| 2005/0066678 A1* | 3/2005 | Kamimura | F25B 29/003 62/238.7 |
| 2006/0053820 A1 | 3/2006 | Taras et al. | |
| 2006/0288724 A1* | 12/2006 | Ambs | F25B 13/00 62/260 |
| 2009/0019884 A1* | 1/2009 | Sekine | F24F 11/0086 62/515 |
| 2011/0146321 A1 | 6/2011 | Jin | |

* cited by examiner

HEAT PUMP SYSTEM WITH AUXILIARY HEAT EXCHANGER

CROSS-REFERENCE TO RELATED APPLICATIONS

This application claims the benefit of U.S. Provisional Patent Application Ser. No. 61/587,596, filed Jan. 17, 2012, the entirety of which is hereby incorporated herein by reference.

TECHNICAL FIELD

The present disclosure relates to heat pump systems.

BACKGROUND

Heat pump systems are used for both heating and cooling an enclosed structure. In general, during the heating mode of operation, liquid refrigerant supplied to an outdoor heat exchanger is evaporated by extracting thermal energy from the outdoor air, and the refrigerant vapor is subsequently condensed in an indoor heat exchanger, thereby heating at least that portion of the enclosed structure in which the indoor heat exchanger is located. The liquid refrigerant is then returned to and evaporated in the outdoor heat exchanger. During the cooling mode of operation, liquid refrigerant supplied to the indoor heat exchanger is evaporated by extracting thermal energy from, and thereby cooling, at least that portion of the enclosed structure in which the indoor heat exchanger is located, and the refrigerant vapor is subsequently condensed in the outdoor heat exchanger. The liquid refrigerant is then returned to and evaporated in the indoor heat exchanger. These conventional processes are well known to skilled artisans in the present field.

During the heating mode of operation, as the outdoor air temperature decreases, the thermal energy extractable from the outdoor air for evaporating the liquid refrigerant in the outdoor heat exchanger also decreases. Thus, when the outdoor air temperature gets cool enough, it becomes increasingly inefficient and difficult to vaporize the refrigerant in sufficient quantity and quality for heating the enclosed structure.

SUMMARY

Disclosed is an embodiment of a method for operating a heat pump system having one or more indoor heat exchangers, one or more compressors, one or more refrigerant superheat controllers, one or more reversing valves, one or more outdoor heat exchangers, and one or more auxiliary energy sources. Each outdoor heat exchanger is paired with an auxiliary heat exchanger. The method includes determining a heat pump operating parameter, and determining if each outdoor heat exchanger is configured for the heating or cooling mode of operation. Then, once the heat pump operating parameter has reached a predetermined operating value (e.g., in response to the heat pump operating parameter reaching a predetermined operating value), the method includes inhibiting a flow of refrigerant through each outdoor heat exchanger that is configured for the heating mode of operation, and enabling the flow of refrigerant to pass through each corresponding paired auxiliary heat exchanger. When the flow of refrigerant through any one or more auxiliary heat exchangers is enabled, the method includes activating the one or more auxiliary energy source(s), thereby exchanging thermal energy between the activated energy source(s) and refrigerant flowing through one or more auxiliary heat exchangers.

Also disclosed is another embodiment of a method for operating a heat pump system having one or more indoor heat exchangers, one or more compressors, one or more refrigerant superheat controllers, one or more reversing valves, one or more outdoor heat exchangers, and an auxiliary system. In an embodiment of the heat pump system, the auxiliary system includes one or more auxiliary energy sources, one or more first diverting valves, one or more second diverting valves, and one or more auxiliary heat exchangers. Each auxiliary heat exchanger is paired with a set of the first and second flow diverting valves and with one of the outdoor heat exchangers. The method includes determining a heat pump operating parameter, and determining if each outdoor heat exchanger is configured for a heating or cooling mode of operation. Then, once the heat pump operating parameter has reached a predetermined operating value (e.g., in response to the heat pump operating parameter reaching a predetermined operating value), the method includes inhibiting a flow of refrigerant through each outdoor heat exchanger that is configured for the heating mode of operation, and enabling the flow of refrigerant to pass through each corresponding paired auxiliary heat exchanger. When the flow of refrigerant through any one or more auxiliary heat exchangers is enabled, the method includes activating the one or more auxiliary energy source(s), thereby exchanging thermal energy between the activated energy source(s) and the refrigerant flowing through one or more auxiliary heat exchangers.

An embodiment of a heat pump system includes one or more indoor heat exchangers, one or more compressors, one or more refrigerant superheat controllers, one or more reversing valves, one or more outdoor heat exchangers, and one or more auxiliary energy sources. Each outdoor heat exchanger is paired with an auxiliary heat exchanger. The heat pump system is operable to inhibit a flow of refrigerant through each outdoor heat exchanger that is configured for a heating mode of operation and enable the flow of refrigerant to pass through each corresponding paired auxiliary heat exchanger once a heat pump operating parameter has reached a predetermined operating value (e.g., in response to a heat pump operating parameter reaching a predetermined operating value). The heat pump system is further operable to activate the one or more auxiliary energy sources when the flow of refrigerant through any one or more auxiliary heat exchangers is enabled, thereby exchanging thermal energy between the activated energy source(s) and refrigerant flowing through one or more auxiliary heat exchangers.

DETAILED DESCRIPTION

While multiple embodiments are disclosed herein, others will be apparent or obvious to one of ordinary skill in the art given the present teaching as a guide. In the following, certain illustrative and non-limiting embodiments are described in detail with reference to the accompanying drawings, wherein like elements are designated by like numerals. It should be clearly understood that there is no intent, implied or otherwise, to limit the disclosure in any form or manner to that illustrated or described herein. All alternative embodiments are considered as being within the metes and bounds of the instant disclosure as defined by the appended claims and any and all equivalents thereof.

Figure 1:
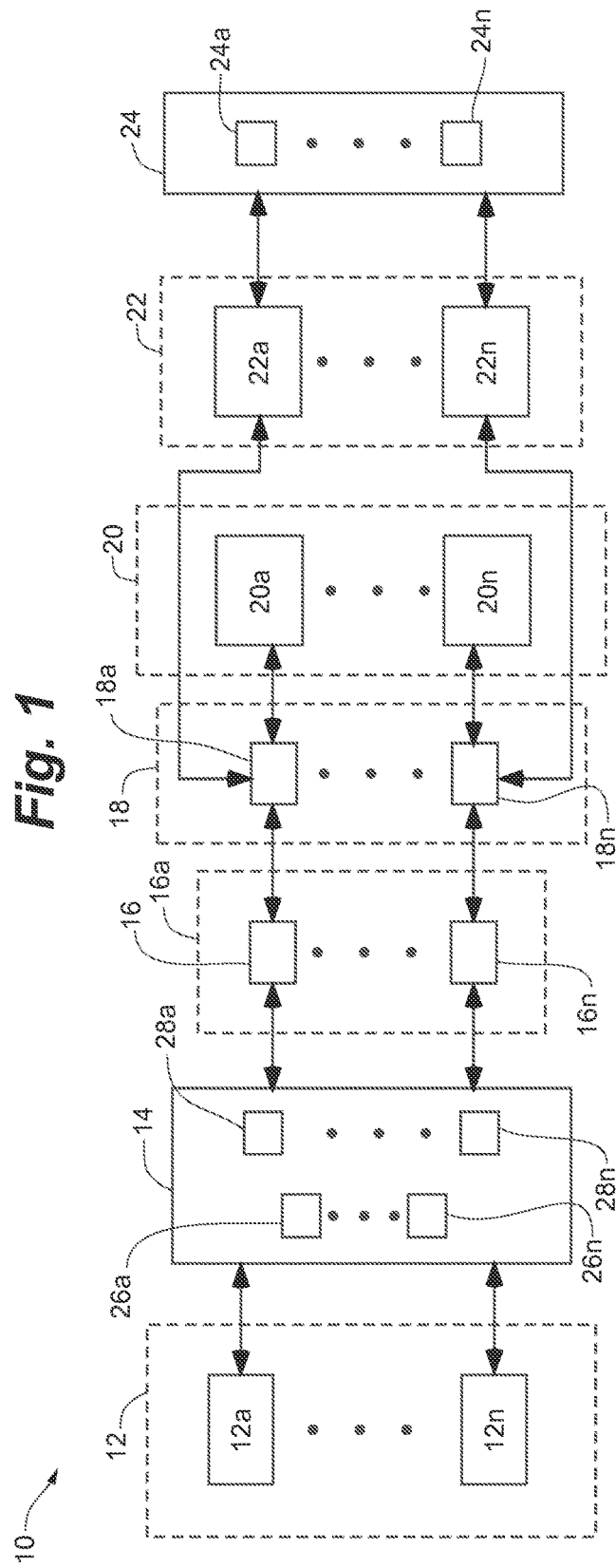
FIG. 1 is a block diagram representation of a heat pump system in accordance with certain embodiments of the present invention.

FIG. 1 is a block diagram representation of components of an embodiment of heat pump system 10. As illustrated, heat pump system 10 includes one or more indoor heat exchangers 12, refrigerant flow management system 14, one or more reversing valves 16, one or more flow valves 18, one or more outdoor heat exchangers 20, one or more auxiliary heat exchangers 22, and one or more auxiliary energy sources 24.

In what follows, while references are sometimes made to multiple flow valves 18, multiple outdoor heat exchangers 20, multiple auxiliary heat exchangers 22, etc., this is by no means always required, and should not be construed (or considered) as implicit or explicit limitations on all of the described embodiments. Accordingly, the metes and bounds of the disclosure include embodiments of heat pump system 10 that have just one of each noted component, e.g., one flow valve, one outdoor heat exchanger, one auxiliary heat exchanger, etc. Thus, when a system or method is described as having "one or more" of a given component, there can be either just one such component or a plurality of such components. The same is true when a system or method is described as having "a" component (or "one" component, or when "an" is used, etc.). However, if a system or method is described as having more than one of a given component, or if a system or method is described as having only one of a given component, then that is the case.

In an embodiment of heat pump system 10, one or more indoor heat exchangers 12, designated as 12a through 12n in FIG. 1, is/are configured for heating or cooling one or more sections (or zones) of an enclosed structure (optionally a building, such as a commercial or residential building). In a non-limiting exemplary embodiment, the enclosed structure is an office space, a residential structure, a school, a storage area, etc. Each indoor heat exchanger 12a through 12n may be operated selectively, at a given time, in any one of a heating mode, a cooling mode, and an off state (i.e., no heating or cooling). In a non-limiting exemplary embodiment, two indoor heat exchangers 12a and 12b can be concurrently operated in the heating and cooling modes, respectively, while a third indoor heat exchanger 12c is in the off state. In some embodiments, two or more indoor heat exchangers 12a through 12n are operated independently of each other. In other embodiments, two or more indoor heat exchangers 12a through 12n are operated concurrently and yet independently from any other indoor heat exchangers. In yet other embodiments, two or more indoor heat exchangers 12a through 12n are operated sequentially and yet independently from any other indoor heat exchangers. For instance, in a non-limiting exemplary embodiment, a zone within an enclosed structure includes three indoor heat exchangers, such that a first indoor heat exchanger is operated during low heating or cooling load conditions. Then, during moderate heating or cooling load conditions, a second indoor heat exchanger starts operating concurrently with the first indoor heat exchanger. And, during high heating or cooling load conditions, a third indoor heat exchanger starts operating concurrently with the first and the second indoor heat exchangers. As will be apparent, the number of indoor heat exchangers 12a through 12n operating concurrently at any given time may be determined by the heating or cooling load. Accordingly, as the heating or cooling load decreases from high to low, the total number of indoor heat exchangers 12a through 12n operating may be sequentially reduced. In certain embodiments, one or more indoor heat exchangers 12 are variable capacity heat exchangers wherein the amount of heating or cooling provided is determinable by one or both of an air flow rate across the heat exchanger coil and a flow rate of a refrigerant through the heat exchanger. In a non-limiting exemplary embodiment, the air flow rate is varied using one or both of a variable speed fan and flow dampers. In certain embodiments, one or more of the indoor heat exchangers 12 may be heat exchanger configurations known in the art including, but not limited to, fin-and-tube, parallel-flow, counter-flow, cross flow, porous including micro-porous, honeycomb, micro-channel, plate type, etc., or any combination thereof. Any additional or alternative configurations and/or modes of operating one or more indoor heat exchangers 12, as will be apparent or obvious to one of ordinary skill in the art, are considered as being within the metes and bounds of the disclosure.

In a non-limiting exemplary embodiment of heat pump system 10, refrigerant flow management system 14 includes one or more compressors 26 (designated as 26a through 26n in FIG. 1) and one or more refrigerant superheat controllers 28 (designated as 28a through 28n in FIG. 1). In some embodiments, each compressor 26a through 26n is a variable speed (or variable capacity) compressor wherein, as is known in the art, each compressor can be selectively operated at a minimum speed, a maximum speed, or a medium speed (e.g., any speed between the minimum and maximum speeds). In a non-limiting exemplary embodiment, each compressor is operated at the minimum speed under low heating/cooling load conditions, at the maximum speed under high heating/cooling load conditions, and at an appropriate medium speed under moderate heating/cooling load conditions. The total number of operating compressors and their respective operating mode(s) and/or speed(s) may be determinable, for example, by the heating and/or cooling load. For instance, compressors 26a and 26c may be operated for satisfying a heating load, and compressors 26b and 26d may be operated for satisfying a cooling load, while compressors 26e through 26n are off. As previously described, the operating speed of each compressor 12a through 12d may be determined by their respective heating and cooling loads. In some embodiments, the total number of compressors 26a through 26n and their respective operating speeds may be determinable by the amount of refrigerant flowing through the system. Any additional or alternative arrangements or combinations of compressors, as may become apparent or obvious to one of ordinary skill in the art, are considered as being within the metes and bounds of the disclosure.

In an embodiment of heat pump system 10, one or more refrigerant superheat controllers 28a through 28n, as are known in the art, is/are used for regulating the flow of refrigerant to ensure that the refrigerant exiting one or more indoor heat exchangers 12 and/or one or more outdoor heat exchangers 20 is saturated or superheated refrigerant vapor devoid of or nearly devoid of any liquid refrigerant. As is also known in the art, the one or more refrigerant superheat controllers 28 may be selected from the group consisting of mechanical expansion valves, electronic expansion valves, and capillary tubes. In some embodiments, at least one refrigerant superheat controller (e.g., 28a) is used with, e.g., paired with, an indoor heat exchanger (e.g., 12a) and an outdoor heat exchanger (e.g., 20a). Thus, each paired set of indoor and outdoor heat exchangers (e.g., 12a and 20a) may share a refrigerant superheat controller (e.g., 28a). In one such exemplary arrangement, a refrigerant superheat controller (i.e., 28a) regulates the flow of refrigerant through whichever one of the corresponding indoor heat exchanger (e.g., 12a) and the corresponding outdoor heat exchanger (e.g., 20a) that is operating as an evaporator. In other embodiments, at least one refrigerant superheat controller (e.g., 28a) is paired with an indoor heat exchanger (e.g., 12a), and at least one other refrigerant superheat controller (e.g., 28b) is paired with an outdoor heat exchanger (e.g., 20a). In one such exemplary arrangement, refrigerant superheat controller 28a regulates the flow of refrigerant through its corresponding indoor heat exchanger 12a when operated as an evaporator, and refrigerant superheat controller 28b regulates the flow of refrigerant through its corresponding outdoor heat exchanger 20a when operated as an evaporator. Any additional or alternative arrangements or combinations of one or more refrigerant superheat controllers 28, as may become apparent or obvious to one of ordinary skill in the art, are considered as being within the metes and bounds of the disclosure.

In an embodiment of heat pump system 10, one or more reversing valves 16a through 16n is/are operable for heating or cooling an enclosed structure by appropriately directing the flow of refrigerant through one or more corresponding indoor or outdoor heat exchangers. For example, in order to heat the enclosed structure (or a zone thereof), one or more reversing valves 16 may be operated to divert the flow of liquid refrigerant to one or more corresponding outdoor heat exchangers 20 while concurrently diverting the flow of refrigerant vapor to one or more corresponding indoor heat exchangers 12. Conversely, in order to cool the enclosed structure (or a zone thereof), one or more reversing valves 16 may be operated to divert the flow of liquid refrigerant to one or more corresponding indoor heat exchangers 12 while concurrently diverting the flow of refrigerant vapor to one or more corresponding outdoor heat exchangers 20. In some embodiments of heat pump system 10, each reversing valve (e.g., 16a) is paired with an indoor heat exchanger (e.g., 12a) and an outdoor heat exchanger (e.g., 20a). In other embodiments, a first reversing valve is paired with an indoor heat exchanger 12 (e.g., 12a), and a second reversing valve is paired with an outdoor heat exchanger 20 (e.g., 20a). A non-limiting exemplary embodiment of one such system is described herein below with reference to FIG. 4.

In a non-limiting exemplary embodiment of heat pump system 10, such as that illustrated in FIG. 1, each outdoor heat exchanger 20a through 20n is paired with a corresponding reversing valve 16a through 16n. Accordingly, heat pump system 10 can be used for concurrently heating and cooling different zones (or sections) of the enclosed structure. For example, outdoor heat exchanger 20a can be used for evaporating the liquid refrigerant directed thereto by the corresponding reversing valve 16a. Subsequently, the vaporized refrigerant from outdoor heat exchanger 20a can be used for heating a first zone by condensing the refrigerant in a first indoor heat exchanger 12a located in the first zone. Concurrently, outdoor heat exchanger 20b can be used for condensing the refrigerant vapor directed thereto by the corresponding reversing valve 16b. Subsequently, the liquid refrigerant from outdoor heat exchanger 20b can be used for cooling a second zone by evaporating the liquid refrigerant in a second indoor heat exchanger 12b located in the second zone.

In what follows, for the sake of convenience in describing the operation of non-limiting exemplary embodiments of heat pump system 10, each reversing valve 16 (e.g., 16a) that is operated or positioned to direct liquid refrigerant to its corresponding outdoor heat exchanger 20 (e.g., 20a) will be referred to (or designated) as being positioned (or operated) for the heating mode of operation. Additionally, the corresponding outdoor heat exchanger (e.g., 20a) having liquid refrigerant flowing therethrough will be considered (or designated) as being configured for the heating mode of operation. The appropriateness of such designations for each reversing valve 16 (e.g., 16a) and the corresponding outdoor heat exchanger 20 (e.g., 20a) should be apparent or obvious to one of ordinary skill in the art since the outdoor heat exchanger is used for evaporating the liquid refrigerant, which is subsequently condensed in one or more indoor heat exchangers 12 so as to heat one or more zones (or sections or portions) of the enclosed structure.

As illustrated in FIG. 1, and as described in further detail with reference to FIG. 2, an embodiment of heat pump system 10 includes one or more flow valves 18, designated as 18a through 18n in FIG. 1.

In an embodiment of heat pump system 10, outdoor heat exchangers 20, designated as 20a through 20n in FIG. 1, are configured for condensing refrigerant vapor or evaporating liquid refrigerant. As such, each outdoor heat exchanger 20a through 20n may be operated selectively, at a given time, in a refrigerant heating mode or a refrigerant cooling mode. In some embodiments, outdoor heat exchangers 20a through 20n are operated independently of each other. In other embodiments, two or more outdoor heat exchangers 20a through 20n are operated concurrently and yet independently from any other outdoor heat exchangers. In yet other embodiments, two or more outdoor heat exchangers 20a through 20n are operated sequentially and yet independently from any other outdoor heat exchangers. For instance, in a non-limiting exemplary embodiment, a first outdoor heat exchanger may be operated during low heating or cooling load conditions. Then, during moderate heating or cooling load conditions, a second outdoor heat exchanger may start operating concurrently with the first outdoor heat exchanger. And, during high heating or cooling load conditions, a third outdoor heat exchanger may start operating concurrently with the first and the second outdoor heat exchangers. As will be apparent, the number of outdoor heat exchangers 20a through 20n operating concurrently at any given time may be determined by the heating or cooling load. Accordingly, as the heating or cooling load decreases from high to low, the total number of outdoor heat exchangers 20a through 20n operating may be sequentially reduced. In certain embodiments, one or more outdoor heat exchangers 20 may be variable capacity heat exchangers wherein the amount of refrigerant heating or cooling provided by the variable capacity heat exchanger is determinable by one or both of an air flow rate across the heat exchanger coil and a flow rate of a refrigerant through the heat exchanger. In a non-limiting exemplary embodiment, the air flow rate is varied using one or both of a variable speed fan and flow dampers. In certain embodiments, one or more of the outdoor heat exchangers 20 may be heat exchanger configurations known in the art including, but not limited to, fin-and-tube, parallel-flow, counter-flow, cross flow, porous including micro-porous, honeycomb, micro-channel, plate type, etc., or any combination thereof. Any additional or alternative configurations and/or modes of operating one or more outdoor heat exchangers 20, as will be apparent or obvious to one of ordinary skill in the art, are considered as being within the metes and bounds of the disclosure.

As is well known in the art, thermal energy extracted from or rejected to the outdoor air is, respectively, used for evaporating or condensing the refrigerant flowing through an outdoor heat exchanger. As is also well known in the art, the capacity (or ability) of an outdoor heat exchanger to evaporate all the liquid refrigerant flowing therethrough decreases with decreasing outdoor air temperature. Thus, when the outdoor air temperature is less than or equal to a heat pump specific predetermined temperature, it becomes increasingly inefficient and/or difficult to vaporize the refrigerant for heating the enclosed structure. To address this problem, in a non-limiting exemplary embodiment, heat pump system 10 includes one or more auxiliary heat exchangers 22, designated as 22a through 22n in FIG. 1. As described in further detail with reference to FIG. 2, heat pump system 10 is configured for positioning (or operating) flow valves 18 to selectively direct the flow of liquid refrigerant through one or more of either outdoor heat exchangers 20 or auxiliary heat exchangers 22, as dictated by a heat pump operating parameter and the heating or cooling operating mode for which each outdoor heat exchanger is configured.

In an embodiment of heat pump system 10, one or more auxiliary heat exchangers 22, designated as 22a through 22n in FIG. 1, is/are configured for vaporizing liquid refrigerant flowing therethrough. At least some (optionally at least substantially all, or all) of the thermal energy required for evaporating the liquid refrigerant flowing through auxiliary heat exchangers 22 is provided by one or more auxiliary energy sources 24, designated as 24a through 24n in FIG. 1. The refrigerant vapor from auxiliary heat exchangers 22 is subsequently returned to and condensed in one or more indoor heat exchangers 12, thereby heating the zone. In some embodiments, auxiliary heat exchangers 22a through 22n are operated independently of each other. In other embodiments, two or more auxiliary heat exchangers 22a through 22n are operated concurrently and yet independently from any other auxiliary heat exchangers. In yet other embodiments, two or more auxiliary heat exchangers 22a through 22n are operated sequentially and yet independently from any other auxiliary heat exchangers. For instance, in a non-limiting exemplary embodiment, a first auxiliary heat exchanger is operated during low heating load conditions. Then, during moderate heating load conditions, a second auxiliary heat exchanger starts operating concurrently with the first auxiliary heat exchanger. And, during high heating load conditions, a third auxiliary heat exchanger starts operating concurrently with the first and the second auxiliary heat exchangers. As will be apparent, the number of auxiliary heat exchangers 22a through 22n operating concurrently at any given time may be determined by the heating load. Accordingly, as the heating load decreases from high to low, the total number of auxiliary heat exchangers 22a through 22n operating may be sequentially reduced. In some embodiments, one or more auxiliary heat exchangers 22 may be variable capacity heat exchangers, wherein the amount of refrigerant heating provided by the variable capacity heat exchanger is determinable by one or more of a flow rate of the refrigerant through the heat exchanger, an air flow rate across the heat exchanger coil, the capacity and/or source of auxiliary energy, etc. In certain embodiments, one or more of the auxiliary heat exchangers 22 may be heat exchanger configurations known in the art including, but not limited to, fin-and-tube, shell-and-tube, parallel-flow, counter-flow, cross flow, porous including micro-porous, honeycomb, micro-channel, plate type, etc., or any combination thereof. In some embodiments, one or more (optionally all) auxiliary heat exchangers 22 may be physically located external to (e.g., outside) the enclosed structure and exposed to the outdoor environment (i.e., elements). In a non-limiting exemplary embodiment, one or more auxiliary heat exchangers 22 is/are physically located with (i.e., in close proximity of) the corresponding outdoor heat exchanger. In certain embodiments, one or more auxiliary heat exchangers 22 may be physically located internal to (e.g., inside) the enclosed structure and, as such, is/are not exposed to the outdoor environment (i.e., elements). Any additional or alternative configurations and/or modes of operating one or more auxiliary heat exchangers 22, as will be apparent or obvious to one of ordinary skill in the art, are considered as being within the metes and bounds of the disclosure.

Figure 2:
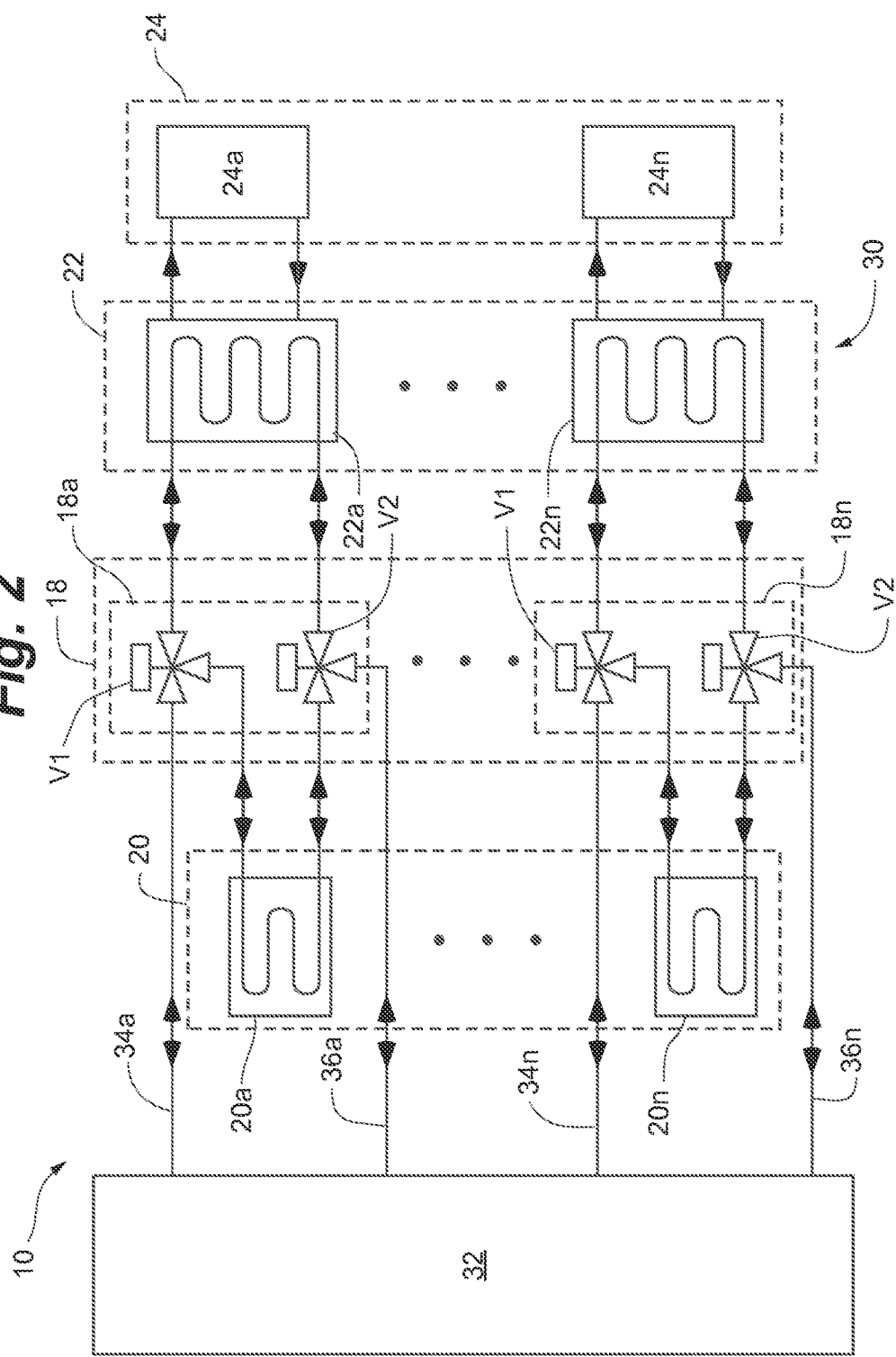
FIG. 2 illustrates one embodiment of an auxiliary system included in the heat pump system of FIG. 1.

FIG. 2 illustrates an embodiment of an auxiliary system 30 within heat pump system 10. As shown, auxiliary system 30 includes one or more flow valves 18, one or more auxiliary heat exchangers 22 and one or more auxiliary energy sources 24. Each flow valve 18 (e.g., 18a) includes first and second flow diverting valves V1 and V2 operable to selectively define a flow path through either a corresponding outdoor heat exchanger 20 (e.g., 20a) or a corresponding auxiliary heat exchanger 22 (e.g., 22a). With reference to FIG. 1, one or more indoor heat exchangers 12, refrigerant flow management system 14, and one or more reversing valves 16 are illustrated collectively in FIG. 2 as block 32.

In a non-limiting exemplary embodiment, first and second flow diverting valves V1 and V2 are two-position valves, each having a first, second and third port. As such, each flow diverting valve V1 and V2 can be operated to define a flow path between the first and the third port when in a first position, and to define a flow path between the second and the third port when in a second position. Accordingly, if the first and the second ports of a first flow diverting valve V1 are respectively in fluid communication with one of the outdoor heat exchangers (e.g., 20a) and the corresponding auxiliary heat exchanger (e.g., 22a), then in the first position, the defined flow path will be between the third port and the paired outdoor heat exchanger (e.g., 20a), and in the second position, the defined flow path will be between the third port and the paired auxiliary heat exchanger (e.g., 22a). As such, refrigerant entering the third port will be diverted to the paired outdoor heat exchanger (e.g., 20a) when first flow diverting valve V1 is in the first position, and refrigerant entering the third port will be diverted to the paired auxiliary heat exchanger (e.g., 22a) when first flow diverting valve V1 is in the second position. Similarly, if the first and the second ports of a second flow diverting valve V2 are respectively in fluid communication with one of the outdoor heat exchangers (e.g., 20a) and the corresponding auxiliary heat exchanger (e.g., 22a), then in the first position, the defined flow path will be between the third port and the paired outdoor heat exchanger (e.g., 20a), and in the second position, the defined flow path will be between the third port and the paired auxiliary heat exchanger (e.g., 22a). As such, refrigerant entering the first port from the paired outdoor heat exchanger (e.g., 20a) will be diverted to the third port when second flow diverting valve V2 is in the first position, and refrigerant entering the second port from the paired auxiliary heat exchanger (e.g., 22a) will be diverted to the third port when second flow diverting valve V2 is in the second position. Thus, when both first and second flow diverting valves V1 and V2 are in the first position, refrigerant entering the third port of a first flow diverting valve V1 will flow through the paired outdoor heat exchanger 20a and exit through the third port of second flow diverting valve V2. As such, the paired auxiliary heat exchanger 22a can be designated or considered as having been isolated since no refrigerant will flow therethrough. Conversely, when both first and second flow diverting valves V1 and V2 are in the second position, the refrigerant entering the third port of a first flow diverting valve V1 will flow through the paired auxiliary heat exchanger 22a and exit through the third port of second flow diverting valve V2. As such, the paired outdoor heat exchanger 20a can be designated or considered as having been isolated since no refrigerant will flow therethrough.

As previously described with reference to FIG. 1, and as is well known in the art, the capacity (or ability) of outdoor heat exchangers 20 to evaporate all the liquid refrigerant flowing therethrough decreases with decreasing outdoor air temperature. Accordingly, in a non-limiting exemplary embodiment of heat pump system 10, auxiliary system 30 is configured for vaporizing the refrigerant when the outdoor air temperature falls below a predetermined minimum temperature, thereby making it possible to efficiently heat the enclosed structure even when the outdoor temperature is low. To that end, as illustrated in FIG. 2, each outdoor heat exchanger (e.g., 20a) and its corresponding auxiliary heat exchanger (e.g., 22a) are paired with and in fluid communication with a flow valve (e.g., 18a) comprising first and second flow diverting valves V1 and V2. In a non-limiting exemplary embodiment, the first and second flow diverting valves V1 and V2 of each flow valve (e.g., 18a) can be positioned (or operated) so as to define a flow path selectively through either the corresponding outdoor heat exchanger 20 (e.g., 20a) or the corresponding auxiliary heat exchanger 22 (e.g., 22a). Accordingly, first and second flow diverting valves V1 and V2 are operable to direct the flow of refrigerant selectively through either the corresponding outdoor heat exchanger or the corresponding auxiliary heat exchanger 22. Such positioning of first and second flow diverting valves V1 and V2 is determined (e.g., dictated) by the heat pump operating parameter and the operating configuration of each outdoor heat exchanger. As previously described with reference to FIG. 1, each reversing valve 16 can be positioned (or operated) for configuring each outdoor heat exchanger for the heating mode of operation or the cooling mode of operation.

In general, the operating effectiveness (or "efficiency") of heat pump system 10 can be analyzed by determining (e.g., calculating or measuring) a heat pump operating parameter. Additionally, the configuration of heat pump system 10 will dictate a corresponding predetermined (or threshold) operating value at which the operating effectiveness (or "efficiency") will start deteriorating. In a non-limiting exemplary embodiment, the predetermined (or threshold) operating value would be one at which the one or more outdoor heat exchangers 20 will not be able to effectively or efficiently evaporate the liquid refrigerant flowing therethrough. In some embodiments, the predetermined operating value is set to a fixed (or default) value that cannot be changed. In other embodiments, the predetermined operating value is changeable from a pre-set (or default) value. Referring back to the foregoing descriptions of the various embodiments of heat pump system 10, the heat pump operating parameter, in a non-limiting exemplary embodiment, is an outdoor air dry-bulb temperature and the corresponding predetermined (or threshold) operating value is a minimum outdoor air dry-bulb temperature, at or below which the flow of refrigerant is desired to be inhibited through the one or more outdoor heat exchangers and enabled through the corresponding one or more auxiliary heat exchangers. In some embodiments, the minimum outdoor air dry-bulb temperature is set at a default value of approximately 32 degrees Fahrenheit (0 degrees Celsius) or less. In one embodiment, the default minimum outdoor air dry-bulb temperature is approximately 32 degrees Fahrenheit (0 degrees Celsius). In another embodiment, the minimum outdoor air dry-bulb temperature is set at a default value of approximately 5 degrees Fahrenheit (−15 degrees Celsius).

The heat pump operating parameter, in some non-limiting exemplary embodiments of heat pump system 10, is the outdoor air wet-bulb or dew-point temperature and the corresponding predetermined (or threshold) operating value respectively is the minimum outdoor air wet-bulb or dew-point temperature at or below which it is desired to inhibit the flow of refrigerant through the one or more outdoor heat exchangers and divert (or enable) the flow of refrigerant through the one or more auxiliary heat exchangers. In certain embodiments, the heat pump operating parameter is selected from the group consisting of outdoor air relative humidity, outdoor air humidity ratio, outdoor air enthalpy, heat pump coefficient of performance, heat pump energy efficiency ratio, operating speed of each compressor, position of each refrigerant superheat controller corresponding to the paired outdoor heat exchanger and auxiliary heat exchanger, position of the reversing valve paired with each outdoor heat exchanger through which the flow of refrigerant has been inhibited, and any combination thereof. The selected heat pump operating parameter will have a corresponding predetermined (or threshold) operating value. For instance, in a non-limiting exemplary embodiment, if the outdoor enthalpy is selected as the heat pump operating parameter, then the corresponding predetermined (or threshold) operating value will be that value of the enthalpy at which the operating effectiveness (or "efficiency") of the heat pump will start deteriorating and therefore, it would not be advisable to continue operating the peat pump in a conventional manner.

In what follows, the various embodiments of heat pump system 10 are described with reference to the outdoor air dry-bulb temperature as representing the heat pump operating parameter and the minimum outdoor air dry-bulb temperature as representing the threshold (or predetermined) operating value. It should be realized that these references and representations are made and used for the sole purpose of convenience in describing the various embodiments of heat pump system 10 and, therefore, are by no means required in all embodiments and should not be construed (or viewed or considered) as implicit or explicit limitations of the described embodiments. The metes and bounds of the disclosure include all heat pump operating parameters and their corresponding predetermined threshold (e.g., minimum or maximum threshold) operating values.

When a reversing valve (e.g., 16a) is positioned for the heating mode of operation, the corresponding outdoor heat exchanger (e.g., 20a) is considered as having been configured for the heating mode of operation such that liquid refrigerant flowing along flow path 34 (e.g., 34a) from block 32 is evaporated in the outdoor heat exchanger (e.g., 20a) and returned to block 32 along flow path 36 (e.g., 36a) as refrigerant vapor, which is subsequently condensed in one or more indoor heat exchangers 12 (e.g., 12a), thereby heating the enclosed structure. Accordingly, when the outdoor air dry-bulb temperature is greater than (i.e., warmer than) the predetermined minimum (or threshold) dry-bulb temperature, such that adequate thermal energy can be extracted from the outdoor air to evaporate the liquid refrigerant, the first and second flow diverting valves V1 and V2 of one or more flow valves (e.g., 18a) are positioned (or operated) so as to direct the flow of refrigerant through the corresponding outdoor heat exchanger (e.g., 20a). In contrast, when the outdoor air dry-bulb temperature is less than (i.e., cooler than) or equal to the predetermined minimum (or threshold) dry-bulb temperature, such that adequate thermal energy cannot be extracted efficiently from the outdoor air to evaporate the liquid refrigerant, the first and second flow diverting valves V1 and V2 of one or more flow valves (e.g., 18a) are positioned (or operated) so as to direct the flow of refrigerant through the corresponding auxiliary heat exchanger (e.g., 22a). Thus, liquid refrigerant entering either the outdoor heat exchanger 20 or the corresponding auxiliary heat exchanger 22 is evaporated therein and exits as superheated or high quality refrigerant vapor.

While each flow valve 18 has been illustrated and described in the foregoing as including first and second flow diverting valves V1 and V2, this does not always have to be the case. In a non-limiting exemplary embodiment, first and/or second flow diverting valve(s) V1 and V2 can each be replaced with two flow valves, as are well known in the art, wherein each flow valve is operable between an open and a closed state. Some embodiments of heat pump system 10 may include additional flow paths and/or flow control components that accomplish the same or substantially similar function as that provided by the first and second flow diverting valves V1 and V2. Any additional or alternative configurations and/or modes of operating first and/or second flow diverting valves V1 and V2 (i.e., flow valve 18), as will be apparent or obvious to one of ordinary skill in the art, are considered as being within the metes and bounds of the disclosure.

When the first and second flow diverting valves V1 and V2 of a given flow valve (e.g., 18a) are positioned (or operated) so as to direct the flow of refrigerant through the corresponding auxiliary heat exchanger (e.g., 22a), the corresponding auxiliary energy source(s) (e.g., 24a) associated therewith is/are operated to provide thermal energy required for evaporating liquid refrigerant entering the auxiliary heat exchanger. In a non-limiting exemplary embodiment, each auxiliary energy source (e.g., 24a) is paired with an auxiliary heat exchanger (e.g., 22a). As such, each paired auxiliary energy source and auxiliary heat exchanger (e.g., 24a and 22a) may be operated independently of any other paired auxiliary energy source and auxiliary heat exchanger (e.g., 24b and 22b). In some embodiments, each auxiliary energy source (e.g., 24a) may be a stand-alone (or self-contained) source of thermal energy. In one such non-limiting exemplary embodiment, one or more auxiliary energy sources (e.g., 24a) include an electric resistance heater operable to evaporate the refrigerant flowing through the corresponding auxiliary heat exchanger (e.g., 22a). In other embodiments, two or more auxiliary energy sources (e.g., 24a and 24b) are grouped or combined together so as to operate as a single unit supplying thermal energy to two corresponding auxiliary heat exchangers (e.g., 22a and 22b). As will be apparent or obvious to one of ordinary skill in the art, additional components and controls may be used to regulate the thermal energy delivered to each of the two corresponding auxiliary heat exchangers (e.g., 22a and 22b). For instance, the components and controls may operate to deliver thermal energy to only those (i.e., one or each) auxiliary heat exchangers that have refrigerant flowing therethrough. Any additional or alternative configurations and/or components and/or modes of operating the one or more auxiliary energy sources 24, as will be apparent or obvious to one of ordinary skill in the art, are considered as being within the metes and bounds of the disclosure.

Figure 3:
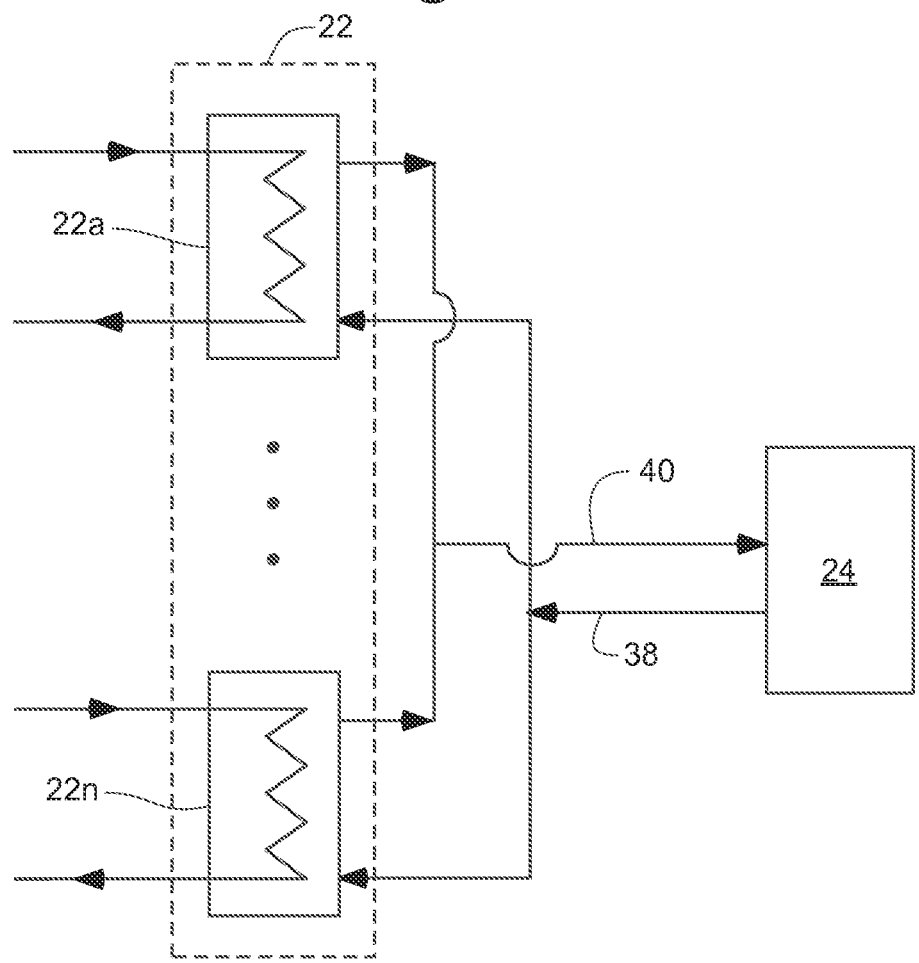
FIG. 3 illustrates one embodiment of an auxiliary energy source for the auxiliary system of FIG. 2.

FIG. 3 illustrates a non-limiting exemplary embodiment of heat pump system 10 having a single (i.e., only one) auxiliary energy source 24 configured to deliver thermal energy to multiple (optionally all) auxiliary heat exchangers 22 having refrigerant flowing therethrough. As shown, flow path 38 delivers thermal energy from auxiliary energy source 24 to each auxiliary heat exchanger 22, and flow path 40 returns residual or unused thermal energy from each auxiliary heat exchanger 22 back to the auxiliary energy source 24. In a non-limiting exemplary embodiment of heat pump system 10, the auxiliary energy source 24 may be a water heater including a water loop for supplying warm or hot water along flow path 38 to each auxiliary heat exchanger 22. Although not shown, it will be apparent or obvious to one of ordinary skill in the art that conventional flow control components, controls and arrangements may also be provided. For example, in order to supply thermal energy to only those auxiliary heat exchangers 22 that have refrigerant flowing therethrough, one or more additional valves and/or one or more bypass flow paths, including controls, may be provided to bypass any auxiliary heat exchanger 22 that does not have refrigerant flowing therethrough. Also, components such as one or more check valves, an expansion tank, one or more pumps, etc. may be provided.

In a non-limiting exemplary embodiment of heat pump system 10, the one or more auxiliary energy sources 24 may be one or more of: water loops, direct and/or indirect fire heating source, radiant heating and/or cooling source, geothermal, ground source, solar, wind, electric resistance heater, impedance heater, induction heater, water heater, boiler, and any other heating and/or cooling sources as will be apparent or obvious to one of ordinary skill in the art.

In some embodiments of heat pump system 10, the one or more auxiliary energy sources 24 is/are operable at a predetermined temperature. For instance, in a non-limiting exemplary embodiment, the temperature of the water supplied by the above-noted single auxiliary energy source 24 to one or more auxiliary heat exchangers 22 may be regulated or maintained at approximately the predetermined temperature. In another non-limiting exemplary embodiment, the one or more auxiliary energy sources 24 may be operated so as to maintain each "activated" auxiliary heat exchanger 22 (i.e., each auxiliary heat exchanger having refrigerant flowing therethrough) at an average temperature approximately equal to the predetermined temperature. In yet another non-limiting exemplary embodiment, the one or more auxiliary energy sources 24 may be operated so as to maintain the refrigerant flowing through each "activated" auxiliary heat exchanger 22 at an average temperature approximately equal to the predetermined temperature. All additional or alternative modes of operating one or more auxiliary heat exchangers 22 and/or auxiliary energy sources 24, as may become apparent or obvious to one of ordinary skill in the art, are considered as being within the metes and bounds of the disclosure.

In some embodiments, the predetermined temperature is set to a fixed (or default) value that cannot be changed. In other embodiments, the predetermined temperature is changeable from a pre-set (or default) value. In some embodiments, the predetermined temperature is set at a default value between approximately 45 degrees Fahrenheit (7.2 degrees Celsius) and 75 degrees Fahrenheit (23.9 degrees Celsius), such as between 55 degrees Fahrenheit (12.8 degrees Celsius) and 65 degrees Fahrenheit (18.3 degrees Celsius). In a non-limiting exemplary embodiment, the predetermined temperature is set at a default value of approximately 60 degrees Fahrenheit (15.6 degrees Celsius). In some embodiments, the one or more auxiliary energy sources may be operable to regulate the predetermined temperature to within ±5 degrees Fahrenheit (±2.8 degrees Celsius), such as within ±1 degrees Fahrenheit (±0.56 degrees Celsius). In a non-limiting exemplary embodiment of heat pump system 10, the default value for the predetermined temperature may be approximately equal to an optimal saturation temperature for the type of refrigerant used in heat pump system 10.

Figure 4:
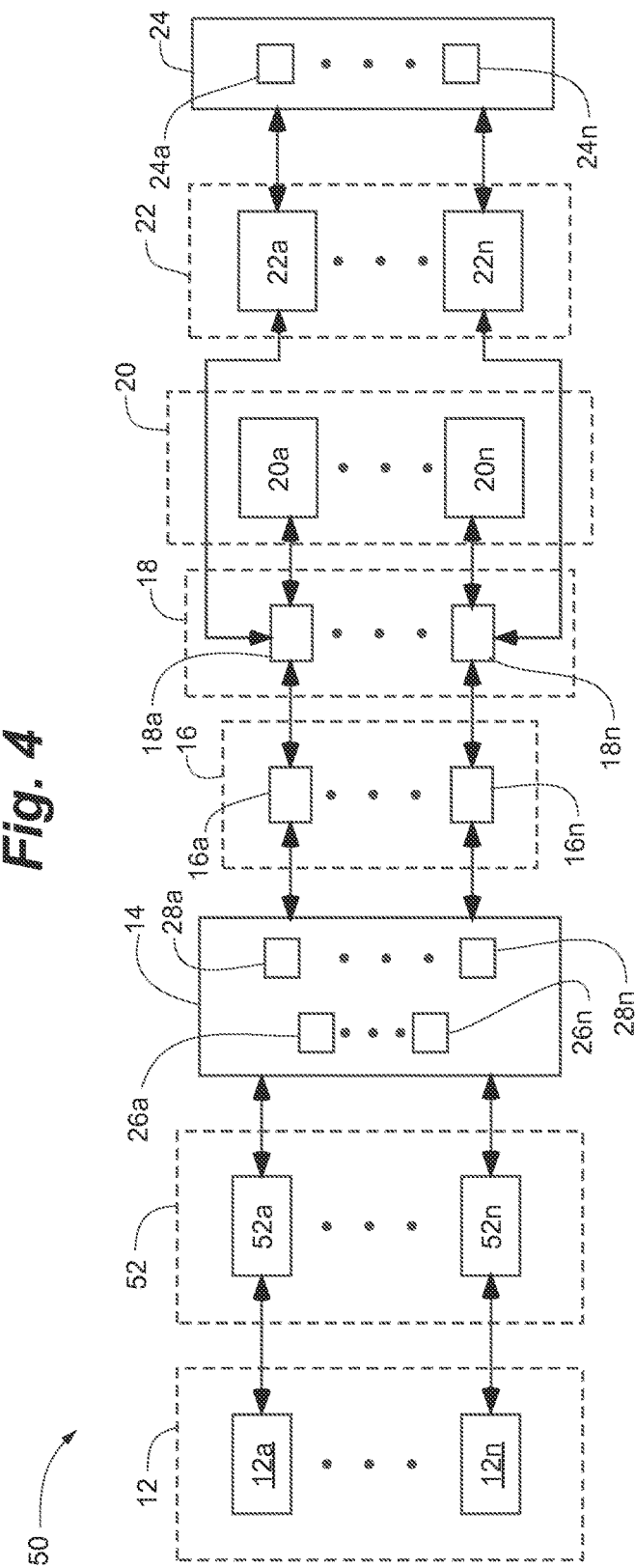
FIG. 4 is a block diagram representation of another heat pump system in accordance with certain embodiments of the present invention.

FIG. 4 is a block diagram representation of an embodiment of heat pump system 50, which is similar to heat pump system 10 illustrated in FIG. 1. Accordingly, like reference numerals in FIGS. 1 and 4 designate like elements of heat pump systems 10 and 50. As illustrated, heat pump system 50 additionally includes one or more reversing valves 52, designated as 52a through 52n in FIG. 4. In a non-limiting exemplary embodiment of heat pump system 50, each reversing valve 52 (e.g., 52a) is paired with an indoor heat exchanger 12 (e.g., 12a) and each reversing valve 16 (e.g., 16a) is paired with an outdoor heat exchanger 20 (e.g., 20a). In certain non-limiting exemplary embodiments, each indoor heat exchanger 12 (e.g., 12a) may be paired with two or more reversing valves 52 (e.g., 52a and 52b). In some non-limiting exemplary embodiments, two or more indoor heat exchangers 12 (e.g., 12a and 12b) may be paired with each reversing valves 52 (e.g., 52a). All additional or alternative configurations as may become apparent or obvious to one of ordinary skill in the art are considered as being within the metes and bounds of this disclosure. The heat pump operating flexibility accorded by such non-limiting exemplary embodiments, as will be known to one of ordinary skill in the art, are advantageously incorporated in variable capacity heat pump systems having a plurality of indoor and outdoor heat exchangers 12 and 20, respectively, a plurality of reversing valves 16 and 52, and a refrigerant flow management system 14 having a plurality of compressors 26 and a plurality of refrigerant superheat controllers 28. Several such commercially available systems are well known. Non-limiting examples of such systems, known as Variable Refrigerant Volume (VRV®) systems, are commercially available from Daikin Industries, Ltd. of Osaka, Japan. One exemplary system available in the United States is the VRVIII wherein the pairing of indoor heat exchangers 12 and reversing valves 52 is provided in a component referred to as the "Branch Selector Unit." Briefly, with the above described configuration (or arrangement), different zones of the enclosed structure can be concurrently heated and/or cooled as has been previously described. In one such embodiment of heat pump system 50, at least some vaporized refrigerant from a first indoor heat exchanger (e.g., 12a) in a first zone being cooled is diverted to and condensed in a second indoor heat exchanger (e.g., 12b) in a second zone being heated. Then, at least some liquid refrigerant from the second indoor heat exchanger (i.e., 12b) is subsequently directed to the first indoor heat exchanger (i.e. 12a) for cooling the first zone. In some embodiments and/or under some operating conditions, wherein the first and second zones have substantially similar (or equal) cooling and heating loads, it may not be necessary to use any compressors, outdoor heat exchangers and/or auxiliary heat exchangers for condensing and/or evaporating any refrigerant. In certain embodiments and/or under certain operating conditions, wherein the first and second zones do not have substantially similar (or equal) cooling and heating loads, it may be necessary to condense and/or evaporate only a portion of the refrigerant in one or more outdoor heat exchangers and/or one or more auxiliary heat exchangers.

With reference to the above described non-limiting exemplary embodiments, a method for operating heat pump system 10 includes determining a heat pump operating parameter and determining if each outdoor heat exchanger (e.g., 20a) is configured for the heating or the cooling mode of operation. In some embodiments, wherein the outdoor air dry-bulb temperature is used as the heat pump operating parameter, the step of "determining" the heat pump operating parameter may comprise measuring or sensing the outdoor air dry-bulb temperature with a temperature sensor (e.g., a thermistor, a thermocouple, a thermometer, etc.). In other embodiments, the step of "determining" the heat pump operating parameter, e.g., "determining" the outdoor air dry-bulb temperature, may include computing or calculating an estimate of the outdoor air dry-bulb temperature using, for example, the "On/Off" cycling rate of one or more of the compressor(s), indoor heat exchanger(s), outdoor heat exchanger(s), etc. In certain embodiments, the step of "determining" the heat pump operating parameter, e.g., "determining" the outdoor air dry-bulb temperature may include computing or calculating an estimate of the outdoor air dry-bulb temperature using, for example, the time rate of change of the temperature in each zone for which the indoor heat exchanger(s) are operating in the heating or cooling mode. In other embodiments, wherein the outdoor air enthalpy is used as the heat pump operating parameter, the step of "determining" the heat pump operating parameter, i.e., "determining" the outdoor air enthalpy may include measuring (e.g., sensing) and/or computing or calculating an estimate of the outdoor air enthalpy using parameters and/or variables from measurement(s) and/or from other calculation(s) or computation(s). As previously described, the selected heat pump operating parameter will have a corresponding predetermined (or threshold) operating value.

In a non-limiting exemplary embodiment of heat pump system 10, the step of determining if each outdoor heat exchanger 20 (e.g., 20a) is configured for the heating or the cooling mode of operation can include monitoring the position of the corresponding reversing valve 16 (e.g., 16a). In some embodiments, the step of determining if each outdoor heat exchanger 20 (e.g., 20a) is configured for the heating or the cooling mode of operation includes measuring and/or computing (or calculating) one or more of the refrigerant temperature, refrigerant flow rate, the direction of refrigerant flow, position of the corresponding refrigerant superheat controller, etc. All additional or alternative methods and/or means for determining the heating or cooling mode of operation for which each outdoor heat exchanger (e.g., 20a) is configured, as may become apparent or obvious to one of ordinary skill in the art, are considered as being within the metes and bounds of the disclosure.

In what follows, as before, the outdoor air dry-bulb temperature is selected as a non-limiting exemplary embodiment for the heat pump operating parameter, and the predetermined (or threshold) operating value is the minimum outdoor air dry-bulb temperature at which it is desired to inhibit the flow of refrigerant through the one or more outdoor heat exchangers and enabled through the one or more auxiliary heat exchangers. Accordingly, in a non-limiting exemplary embodiment of heat pump system 10, if the outdoor air dry-bulb temperature is less than or equal to (e.g., in response to the outdoor air temperature reaching or falling below) the minimum outdoor air dry-bulb temperature, the method includes inhibiting the flow of refrigerant through each outdoor heat exchanger (e.g., 20a) configured for the heating mode of operation (i.e., each outdoor heat exchanger (e.g., 20a) that has its paired reversing valve (e.g., 16a) positioned in the heating mode of operation), and enabling (or directing) the flow of refrigerant through the corresponding auxiliary heat exchanger (e.g., 22a). Additionally, the method includes activating one or more auxiliary energy sources 24 for exchanging thermal energy between the auxiliary energy source(s) and refrigerant flowing through each "active" (or "activated") auxiliary heat exchanger (e.g., 22a) having refrigerant flowing therethrough.

As is well known in the art, conventional heat pump systems include a defrost controller for purposes of removing any ice (or frost) that may accumulate (or build up) on the coil of the outdoor heat exchanger(s) when used for evaporating the liquid refrigerant flowing therethrough. In some embodiments, the defrost operation is initiated and/or terminated based on a pre-specified timing sequence, which may or may not be adjustable (or changeable). In certain embodiments, the defrost operation is initiated and/or terminated based on a coil temperature measurement and/or an outdoor air dry-bulb temperature measurement. In some embodiments, the defrost operation may be initiated and/or terminated based on a combination of the pre-specified timing sequence and one or both of the measured coil temperature and the outdoor air dry-bulb temperature. Accordingly, in the present invention, it is no longer necessary to perform a defrost cycle for the outdoor heat exchanger(s) 20 through which the flow of refrigerant has been inhibited. Therefore, the method can optionally include inhibiting defrost operation for each outdoor heat exchanger 20a through 20n through which the flow of refrigerant has been inhibited. In some embodiments, for each outdoor heat exchanger 20a through 20n through which the flow of refrigerant has been inhibited, the method includes setting the corresponding auxiliary heat exchanger temperature equal to the previously described predetermined temperature. In certain embodiments, when the flow of refrigerant has been inhibited through any outdoor heat exchanger 20, the method includes setting the outdoor air dry-bulb temperature equal to the predetermined temperature. In some embodiments, the method includes operating the auxiliary energy source(s) 24 such that each auxiliary heat exchanger (e.g., 22a) having refrigerant flowing therethrough is maintained at a temperature equal to the predetermined temperature.

As previously described, each outdoor heat exchanger (e.g., 20a) and each corresponding auxiliary heat exchanger (e.g., 22a) are paired with a flow valve (e.g., 18a) having first and second flow diverting valves V1 and V2. As such, in a non-limiting exemplary embodiment of heat pump system 10, the method includes operating (or positioning) first and second flow diverting valves V1 and V2 for directing (or diverting) the flow of refrigerant selectively through either the corresponding outdoor heat exchanger (e.g., 20a) or the corresponding auxiliary heat exchanger (e.g., 22a).

While the foregoing embodiments of heat pump system 10 and the embodiments for operating heat pump systems 10 are primarily focused on the heating mode of operation, this is by no means limiting. For instance, heat pump system 10 can be configured and operated for inhibiting the flow of refrigerant through each outdoor heat exchanger for which the corresponding reversing valve is in the cooling mode of operation and enabling the flow of refrigerant through the corresponding auxiliary heat exchanger while the outdoor air temperature is greater (e.g., warmer) than a third predetermined temperature. For example, as the outdoor air temperature increases, the capacity (or ability) of the outdoor heat exchanger to condense the refrigerant vapor by rejecting thermal energy to the outdoor air decreases. Accordingly, during the cooling mode of operation, the one or more auxiliary energy sources may be operated to supply cold water (e.g., chilled or ground source) to the one or more auxiliary heat exchangers having refrigerant flowing therethrough. In some embodiments, heat pump system 10 may be operated to concurrently provide both heating and cooling to different sections or zones of an enclosed structure. As such, some zones may be heated while other zones are cooled. In certain embodiments, vaporized refrigerant from the indoor heat exchanger(s) in the one or more zones being cooled is diverted to and condensed in the indoor heat exchanger(s) in the one or more zones being heated. The liquid refrigerant from the indoor heat exchanger(s) in the one or more zones being heated is diverted to and evaporated in the indoor heat exchanger(s) in the one or more zones being cooled.

In view of the foregoing disclosure, additional and/or alternate configurations and/or methods for operating heat pump systems may become apparent or obvious to one of ordinary skill in the art. All such possibilities are considered as being within the metes and bounds of the instant disclosure. For instance, while the illustrated and/or described embodiments refer to particular features and/or functions, the disclosure is considered to also include embodiments having combinations of features and/or functions different from those described and/or illustrated. Accordingly, the scope and intent of the disclosure is intended to embrace all alternatives, modifications, variations, etc., as may become apparent or obvious to one of ordinary skill in the art. The metes and bounds of the disclosure are defined by the appended claims and any and all equivalents thereof.

What is claimed is:

1. A method of operating a heat pump system in a heating mode of operation, the heat pump system comprising:
    one or more indoor heat exchangers;
    one or more compressors;
    one or more refrigerant superheat controllers;
    one or more reversing valves;
    one or more outdoor heat exchangers, each paired with an auxiliary heat exchanger that is located outdoors so as to be exposed to an outdoor environment, each auxiliary heat exchanger located adjacent a corresponding one of said one or more outdoor heat exchangers;
    one or more auxiliary energy sources, the one or more auxiliary energy sources comprising a water heater including a water loop for supplying heated water along a water flow path to at least one of the one or more auxiliary heat exchangers; and
    first and second flow diverting valves, or four flow valves, operable to selectively define a refrigerant flow path through either a corresponding outdoor heat exchanger or a corresponding auxiliary heat exchanger, such that when the refrigerant flow path is defined through the corresponding outdoor heat exchanger the corresponding auxiliary heat exchanger is isolated, and when the refrigerant flow path is defined through the corresponding auxiliary heat exchanger the corresponding outdoor heat exchanger is isolated,
    the method comprising:
        determining a heat pump operating parameter;

once the heat pump operating parameter has reached a predetermined operating value and an outdoor temperature is 32 degrees Fahrenheit or less:
inhibiting a flow of refrigerant to each outdoor heat exchanger that is configured for the heating mode of operation;
enabling said flow of refrigerant to pass through each corresponding paired auxiliary heat exchanger; and
activating the one or more auxiliary energy sources when said flow of refrigerant through any one or more auxiliary heat exchangers is enabled, thereby exchanging thermal energy between the activated auxiliary energy source(s) and refrigerant flowing through one or more auxiliary heat exchangers, the method comprising regulating the activated auxiliary energy source(s) so as to substantially maintain a desired temperature for water supplied by the water heater, for one or more auxiliary heat exchangers, and/or for refrigerant flowing through one or more auxiliary heat exchangers.

2. The method of claim 1, comprising inhibiting defrost operation for each outdoor heat exchanger through which said flow of refrigerant has been inhibited.

3. The method of claim 1, comprising changing the desired temperature from a default setting of 60 degrees Fahrenheit (15.6 degrees Celsius).

4. The method of claim 1, wherein the heat pump operating parameter is selected from the group consisting of outdoor air dry-bulb temperature, outdoor air wet-bulb temperature, outdoor air dew-point temperature, outdoor air relative humidity, outdoor air humidity ratio, outdoor air enthalpy, heat pump coefficient of performance, heat pump energy efficiency ratio, operating speed of each compressor, and any combination thereof.

5. The method of claim 1, comprising:
determining an outdoor air temperature;
using the outdoor air temperature as the heat pump operating parameter; and
setting the predetermined operating value equal to a minimum outdoor air temperature.

6. The method of claim 5, comprising changing the minimum outdoor air temperature from a default setting of 5 degrees Fahrenheit (−15 degrees Celsius).

7. The method of claim 1, comprising changing the predetermined operating value from a default value.

8. The method of claim 1, wherein the heat pump system comprises the first and second flow diverting valves, the first flow diverting valve is located between an inlet to a corresponding outdoor heat exchanger and an inlet to a corresponding auxiliary heat exchanger, and the second flow diverting valve is located between an outlet from the corresponding outdoor heat exchanger and an outlet from the corresponding auxiliary heat exchanger.

9. The method of claim 8, wherein the first and second flow diverting valves are two-position valves each having a first, second, and third port.

10. The method of claim 1, comprising varying a volume of refrigerant flowing through the heat pump system while operating.

11. The method of claim 1, comprising varying a heating capacity and a cooling capacity of the heat pump system while operating.

12. A method of operating a heat pump system in a heating mode of operation, the heat pump system comprising:
one or more indoor heat exchangers;
one or more compressors;
one or more refrigerant superheat controllers;
one or more reversing valves;
one or more outdoor heat exchangers; and
an auxiliary system comprising:
one or more auxiliary energy sources comprising a water heater;
one or more first flow diverting valves;
one or more second flow diverting valves; and
one or more auxiliary heat exchangers located outdoors, each auxiliary heat exchanger paired with a set of the first and second flow diverting valves and with a corresponding one of the outdoor heat exchangers, each auxiliary heat exchanger located adjacent a corresponding outdoor heat exchanger,
the water heater including a water loop for supplying heated water along a water flow path to at least one of the one or more auxiliary heat exchangers;
the set of first and second flow diverting valves operable to selectively define a refrigerant flow path through either a corresponding auxiliary heat exchanger or a corresponding outdoor heat exchanger, such that when the refrigerant flow path is defined through the corresponding auxiliary heat exchanger the corresponding outdoor heat exchanger is isolated, and when the refrigerant flow path is defined through the corresponding outdoor heat exchanger the corresponding auxiliary heat exchanger is isolated;
the method comprising:
determining a heat pump operating parameter;
once the heat pump operating parameter has reached a predetermined operating value and an outdoor temperature is 32 degrees Fahrenheit or less:
inhibiting a flow of refrigerant to each outdoor heat exchanger that is configured for the heating mode of operation; and
enabling said flow of refrigerant to pass through each corresponding paired auxiliary heat exchanger; and
operating the one or more auxiliary energy sources when said flow of refrigerant through any one or more auxiliary heat exchangers is enabled, thereby exchanging thermal energy between the activated auxiliary energy source(s) and refrigerant flowing through one or more auxiliary heat exchangers, the auxiliary energy source(s) operated so as to substantially maintain a desired temperature for water supplied by the water heater, for one or more auxiliary heat exchangers, and/or for refrigerant flowing through one or more auxiliary heat exchangers.

13. The method of claim 12, comprising inhibiting defrost operation for each outdoor heat exchanger through which said flow of refrigerant has been inhibited.

14. The method of claim 12, comprising changing the desired temperature from a default setting of 60 degrees Fahrenheit (15.6 degrees Celsius).

15. The method of claim 12, wherein the heat pump operating parameter is selected from the group consisting of outdoor air dry-bulb temperature, outdoor air wet-bulb temperature, outdoor air dew-point temperature, outdoor air relative humidity, outdoor air humidity ratio, outdoor air enthalpy, heat pump coefficient of performance, heat pump energy efficiency ratio, operating speed of each compressor, and any combination thereof.

16. The method of claim 12, comprising:
determining an outdoor air temperature;
using the outdoor air temperature as the heat pump operating parameter; and setting the predetermined operating value equal to a minimum outdoor air temperature.

17. The method of claim 16, comprising changing the minimum outdoor air temperature from a default setting of 5 degrees Fahrenheit (−15 degrees Celsius).

18. The method of claim 12, comprising changing the predetermined operating value from a default value.

19. The method of claim 12, wherein a first of the one or more flow diverting valves is located between an inlet to a corresponding outdoor heat exchanger and an inlet to a corresponding auxiliary heat exchanger, and a second of the one or more flow diverting valves is located between an outlet from the corresponding outdoor heat exchanger and an outlet from the corresponding auxiliary heat exchanger.

20. The method of claim 19, wherein the first and second of the one or more flow diverting valves are two-position valves each having a first, second, and third port.

21. The method of claim 12, comprising varying a volume of refrigerant flowing through the heat pump system while operating.

22. The method of claim 12, comprising varying a heating capacity and a cooling capacity of the heat pump system while operating.

23. A heat pump system comprising:
one or more indoor heat exchangers;
one or more compressors;
one or more refrigerant superheat controllers;
one or more reversing valves;
one or more outdoor heat exchangers, each paired with an auxiliary heat exchanger that is located outdoors, each auxiliary heat exchanger located adjacent a corresponding one of said one or more outdoor heat exchangers;
one or more auxiliary energy sources comprising a boiler;
first and second flow diverting valves, or four flow valves, operable to selectively define a refrigerant flow path either through one of the one or more outdoor heat exchangers or through a corresponding auxiliary heat exchanger, such that when the refrigerant flow path is defined through the corresponding auxiliary heat exchanger the corresponding outdoor heat exchanger is isolated, and when the through flow path is defined through an outdoor heat exchanger the corresponding auxiliary heat exchanger is isolated;
the heat pump system operable to:
inhibit a flow of refrigerant to each outdoor heat exchanger that is configured for a heating mode of operation, and enable said flow of refrigerant to pass through each corresponding paired auxiliary heat exchanger once the heat pump operating parameter has reached a predetermined operating value; and
activate the one or more auxiliary energy sources when said flow of refrigerant through any one or more auxiliary heat exchangers is enabled, thereby exchanging thermal energy between the activated auxiliary energy source(s) and refrigerant flowing through one or more auxiliary heat exchangers, so as to substantially maintain a desired temperature for water supplied by the boiler, for one or more auxiliary heat exchangers, and/or for refrigerant flowing through one or more auxiliary heat exchangers.

24. The heat pump system of claim 23, wherein the system is operable to inhibit defrost operation for each outdoor heat exchanger through which said flow of refrigerant has been inhibited.

25. The heat pump system of claim 23, wherein the desired temperature is changeable from a default setting of 60 degrees Fahrenheit (15.6 degrees Celsius).

26. The heat pump system of claim 23, Wherein the heat pump operating parameter is selected from the group consisting of outdoor air dry-bulb temperature, outdoor air wet-bulb temperature, outdoor air dew-point temperature, outdoor air relative humidity, outdoor air humidity ratio, outdoor air enthalpy, heat pump coefficient of performance, heat pump energy efficiency ratio, operating speed of each compressor, and any combination thereof.

27. The heat pump system of claim 23, wherein
the heat pump operating parameter is an outdoor air temperature; and
the predetermined operating value is a minimum outdoor air temperature at which said flow of refrigerant is inhibited through each outdoor heat exchanger and enabled through each corresponding paired auxiliary heat exchanger.

28. The heat pump system of claim 27, wherein the minimum outdoor air temperature is changeable from a default setting of 5 degrees Fahrenheit (−15 degrees Celsius).

29. The heat pump system of claim 23, wherein the predetermined operating value is changeable from a default value.

30. The heat pump system of claim 23, wherein the heat pump system comprises the first and second flow diverting valves, the first flow diverting valve is located between an inlet to a corresponding outdoor heat exchanger and an inlet to a corresponding auxiliary heat exchanger, and the second flow diverting valve is located between an outlet from the corresponding outdoor heat exchanger and an outlet from the corresponding auxiliary heat exchanger.

31. The heat pump system of claim 30, wherein the first and second flow diverting valves are two-position valves each having a first, second, and third port.

32. The heat pump system of claim 23, wherein each outdoor heat exchanger is in the heating, mode of operation if each reversing valve in fluid communication therewith is positioned for the heating mode of operation.

33. The heat pump system of claim 23, comprising a variable refrigerant volume heat pump.

34. The heat pump system of claim 23, comprising a variable heating and cooling capacity heat pump.

35. The heat pump system of claim 23, comprising a variable refrigerant flow heat pump.

* * * * *